United States Patent [19]
Belser

[11] Patent Number: 5,611,550
[45] Date of Patent: Mar. 18, 1997

[54] VEHICLE WINDOW SEAL ASSEMBLY ADAPTED FOR ROBOTICS APPLICATION

[75] Inventor: John Belser, Northville, Mich.

[73] Assignee: The Standard Products Company, Cleveland, Ohio

[21] Appl. No.: 490,676

[22] Filed: Jun. 15, 1995

[51] Int. Cl.⁶ .............................. F16J 15/02; F16J 15/12
[52] U.S. Cl. ...................... 277/184; 277/204; 47/489.1; 47/495.1
[58] Field of Search ................................. 277/118, 204, 277/217, 222, 226; 49/489.1, 495.1, 498.1; 296/93

[56] References Cited

U.S. PATENT DOCUMENTS

| | | | |
|---|---|---|---|
| 843,740 | 2/1907 | Fenn | 277/204 |
| 2,700,183 | 1/1955 | Beare | 49/489.1 |
| 4,614,347 | 9/1986 | Kruschwitz | 277/184 |
| 4,617,220 | 10/1986 | Ginsher | 49/498.1 |
| 5,391,416 | 2/1995 | Kunert | 49/495.1 |

FOREIGN PATENT DOCUMENTS

| | | | |
|---|---|---|---|
| 357973 | 3/1990 | European Pat. Off. | 49/498.1 |
| 395485 | 10/1990 | European Pat. Off. | 49/489.1 |
| 229718 | 9/1988 | Japan | 49/498.1 |

*Primary Examiner*—Scott Cummings
*Attorney, Agent, or Firm*—Harness, Dickey & Pierce, P.L.C.

[57] ABSTRACT

A seal assembly for the perimeter of a window of an automotive vehicle that has an elongated support channel extending around the window perimeter and an elongated continuous tubular sealing member. The elongated continuous tubular sealing member is wound at least twice around the perimeter in overlapping relation with itself and secured in the channel to provide an inner seal and an outer seal with a transition length therebetween, the ends of the elongated continuous tubular sealing member being positioned proximate to and abutting the transition length.

6 Claims, 3 Drawing Sheets

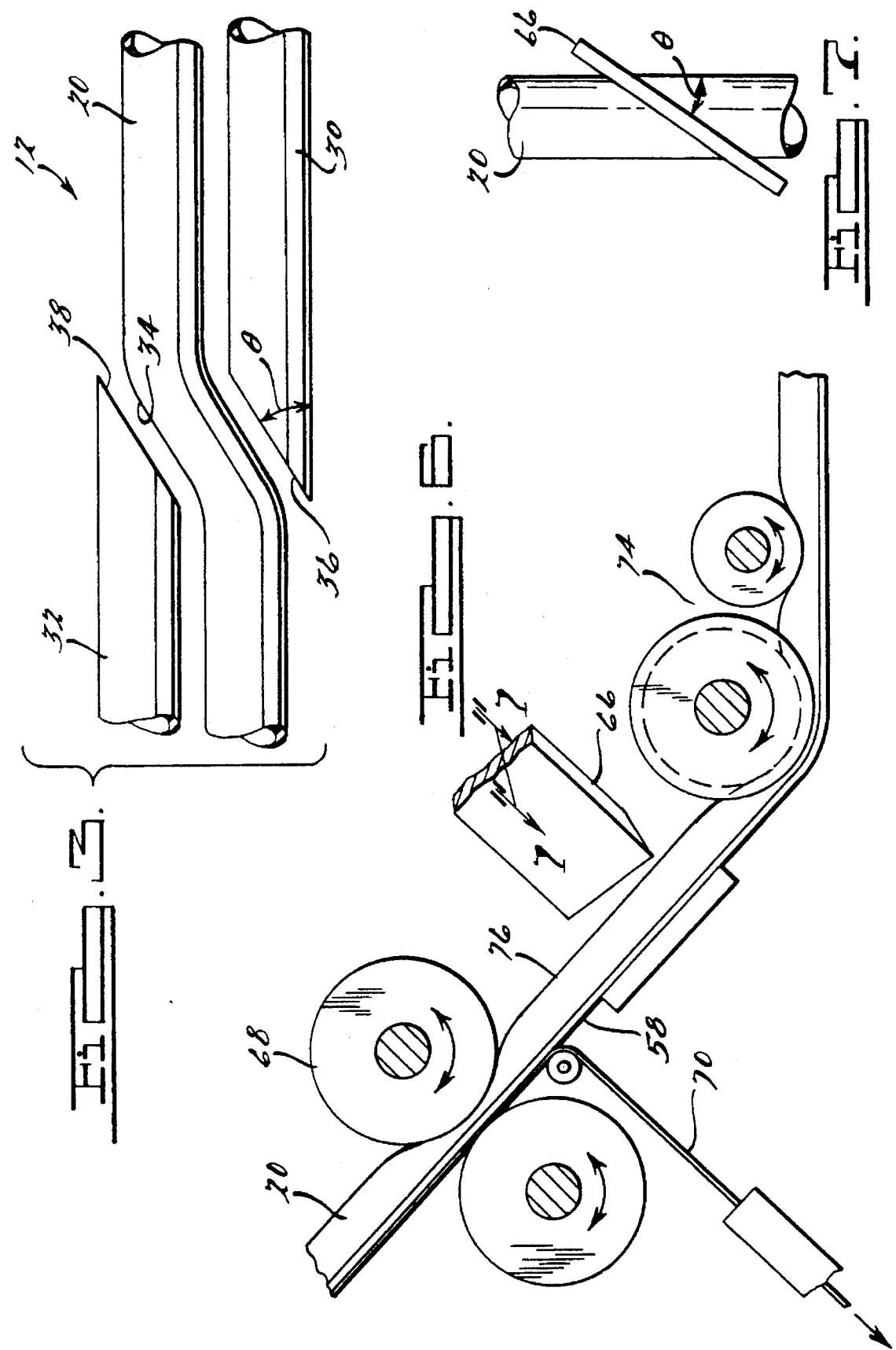

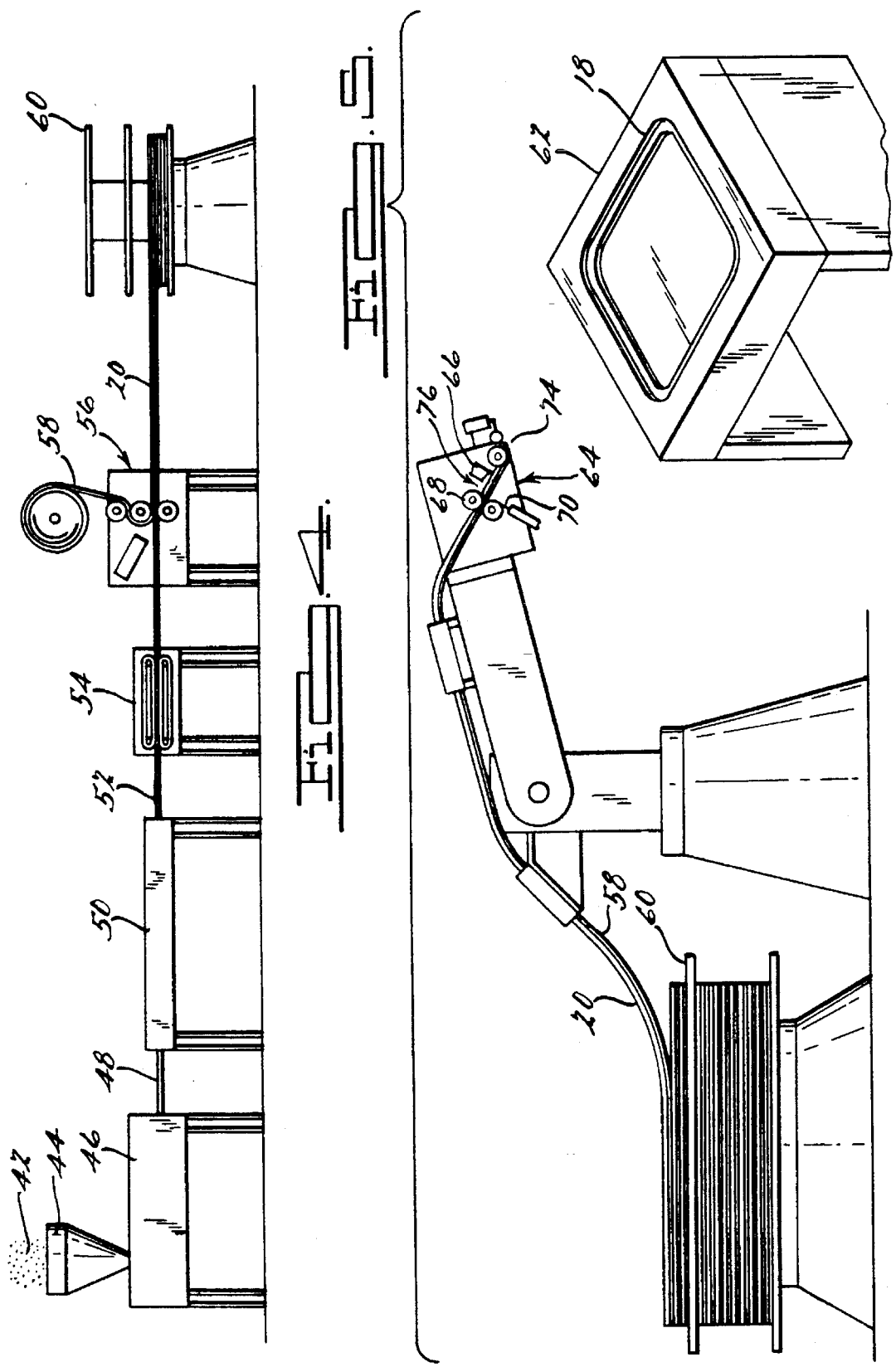

VEHICLE WINDOW SEAL ASSEMBLY ADAPTED FOR ROBOTICS APPLICATION

BACKGROUND OF THE INVENTION

1. Technical Field

The present invention relates to seal assemblies, and more particularly, to seal assemblies which can be robotically installed around automotive vehicle windows or hatches.

2. Discussion

Seals for automotive windows or hatches are generally made of elastomeric thermosetting materials for reasons of economy and sealing effectiveness. Such elastomeric seals are made by extruding unset elastomeric material, vulcanizing or heat setting the elastomeric material and cutting to length. The seals are then generally installed on the vehicle with opposing ends in an abutting relationship. It is desirable that these seal assemblies be economical to manufacture and easy to install on the vehicle. Moreover, for satisfactory performance in the present day automotive industry, seal assemblies must effectively seal the interior of the vehicle from noise and weather elements of the external environment.

Effective sealing is made difficult where the seal must extend entirely around a window or hatch perimeter, especially where the perimeter has corners having small radii. Generally, seals which are wide enough to effectively seal without leaks tend to be difficult to install around window openings having curves with small radii. Also, once installed, due to compression and tension induced at the radii surfaces, the seal can twist resulting in an inefficient seal.

Moreover, seal assemblies extending around a window perimeter and ending in an abutting relationship have an interruption of the seal at the abutting ends whereat a potential cause for leaks is created. Thus, merely abutting ends together provides a potentially unreliable joint. However, the watertight and airtight nature of the seal can be maintained at the joint by bonding the ends together. Unfortunately, the known methods of joining the ends have major inherent disadvantages.

Currently, there are two methods of joint bonding currently being used in the industry: vulcanizing and adhesives. Vulcanizing the two ends together creates a chemically bonded joint that is normally as flexible as the parent materials. This method, however, involves high tooling costs for joint molds, capital expenditures for the plant, and high overhead costs for "work in process". The other method, adhesives, joins the ends using a cyanoacrylate adhesive effectuating a room temperature vulcanization (RTV) bond. This type of joining material tends to provide a crystalline structure joint with high failure rates. Secondary operations to fixture the joints while the adhesive is curing also involves high overhead and costs for "work in process". In short, vulcanizing or otherwise bonding ends together is expensive. Furthermore, vulcanizing or bonding the ends of the seal forms a continuous loop which is difficult for a robot to install on the automotive vehicle.

Moreover, a number of problems manifest themselves when attempting the robotic application of a closed loop seal onto an automotive vehicle opening. The problems of linear length tolerance build-up on either the seal or door assembly make reliable application difficult. Accurate length and torsional rigidity control of the seal is required for robotic installation of a seal loop. Also, sheet metal tolerances affect the overall fit of the seal assembly because the seal has defined lengths between corners. Tolerance variances can create extensive fit problems resulting in line stoppage or improperly fitted seal assemblies. Furthermore, the fact that the corners may need to be molded for rigidity adds to the complexity of the seal assembly.

Therefore, it would be desirable to provide a sealing system which eliminates the above inherent conditions in current sealing applications for automotive vehicle windows and hatches. It would further be desirable to provide a sealing system which has an elongated support channel which extends around the window perimeter. It would further be desirable to provide an elongated continuous tubular sealing member secured within the channel and wound around the perimeter of the window in overlapping relation with itself to provide an inner seal and an outer seal with a transition portion therebetween. As used herein, inner refers to a position proximate to the vehicle whereas outer refers to an adjacent position proximate to the window. It would further be desirable to provide the ends of the elongated tubular sealing member wherein they are cut at a degree $\Theta$ to provide an abutting surface. Moreover, it would be desirable to provide the elongated continuous sealing member ends wherein they are positioned proximate to and abutting the transition portion thereby creating an inner and outer seal such that air and water are not allowed to penetrate the dual seal configuration to enter the vehicle interior.

It would further be desirable to provide an economical seal which can be easily installed on an automotive vehicle by a robot. It would additionally be desirable to provide an elongated continuous sealing member which can be applied from a coil or magazine, extends around corners having small radii without difficulty, and which provides both an inner and outer seal. It would further be desirable to provide a sealing member which is highly resistant to leaking in that the elongated continuous sealing member extends around the window perimeter without a joint and there are no splices or molded portions likely to cause leaking. It would further be desirable to provide a seal assembly which easily adjusts for body and section variation and is unaffected by tolerance variations in the automotive sheet metal.

SUMMARY OF THE INVENTION

The present invention is directed at providing a seal assembly for the perimeter of a window of an automotive vehicle. Accordingly, the seal assembly includes an elongated support channel extending around the window perimeter and containing an elongated continuous tubular sealing member with two ends cut at angle $\Theta$. The elongated continuous sealing member is wound at least twice around the perimeter of the window in overlapping relation with itself, bending at an angle $\Theta$. Also, the elongated continuous sealing member is secured in the channel to provide an inner seal and an outer seal with a transition length therebetween, the ends of the elongated continuous sealing member being positioned proximate to the transition length and abutting thereto. Further advantages of the present invention will be realized from the following description taken in conjunction with the drawings appended hereto.

BRIEF DESCRIPTION OF THE DRAWINGS

The various advantages of the present invention will become apparent to one skilled in the art upon reading the following specification and by reference to the drawings in which:

FIG. 3 is an exploded view of a portion of the elongated continuous sealing member of the present invention;

FIG. 4 shows a schematic view of the preferred process for making the elongated continuous sealing member in accordance with the present invention;

FIG. 5 shows a schematic view of the preferred process utilizing the robot that applies the elongated continuous sealing member to the seal assembly in accordance with the present invention;

FIG. 6 is an enlarged view of a portion of the robot and process shown in FIG. 5; and FIG. 7 is a portion of the process shown in FIG. 6, viewed along line 7—7 in FIG. 6.

DESCRIPTION OF THE PREFERRED EMBODIMENTS

Figure 1:
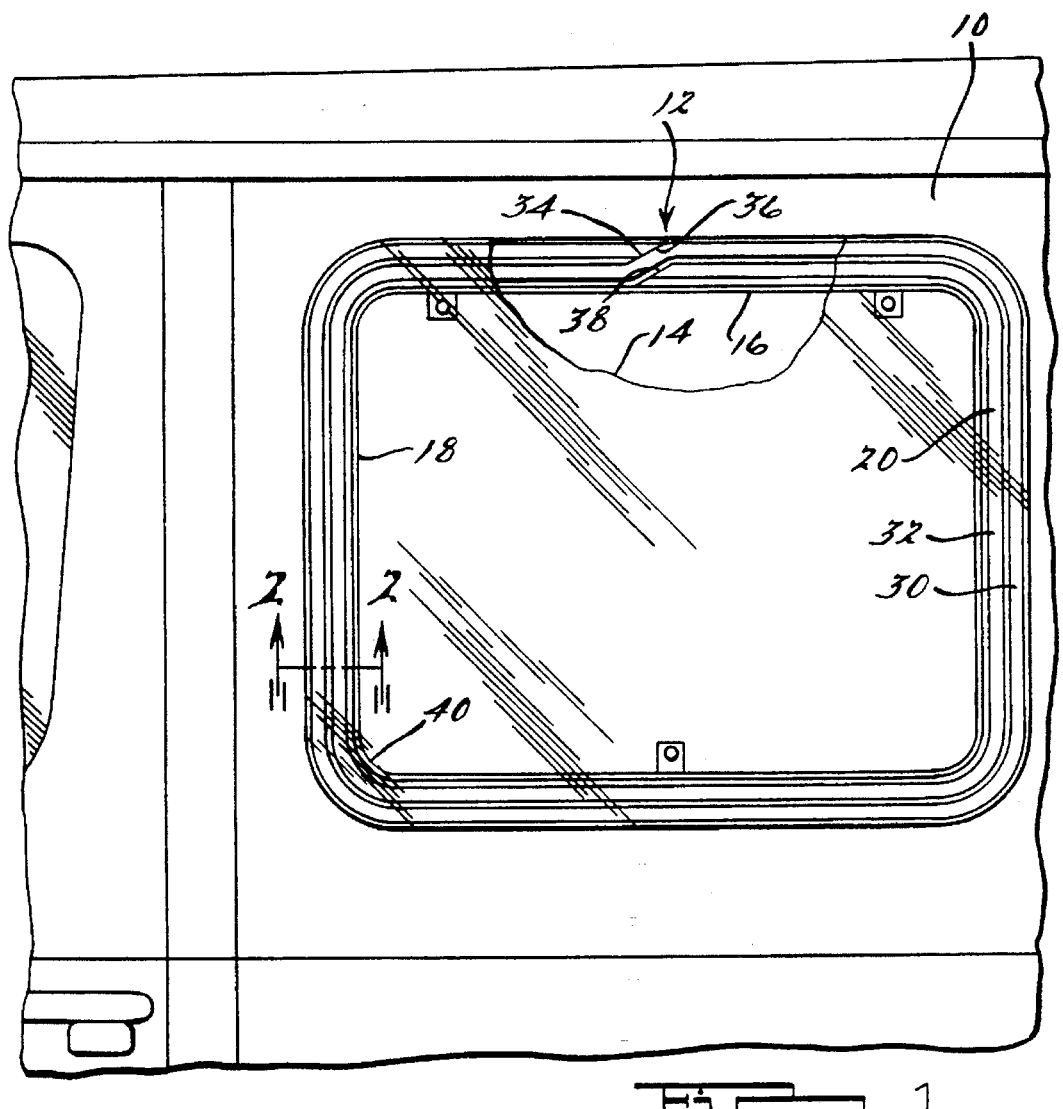
FIG. 1 is a partial view of an exemplary side of an automotive vehicle showing the preferred embodiment of the seal assembly of the present invention.

Referring to FIG. 1, seal assembly 12 is shown installed in an exemplary view of a van rear window. A portion of the automotive vehicle side 10 is depicted to illustrate the relationship between the seal assembly 12 and the automotive window glass 14. The seal assembly 12 is shown in a seal relationship between the automotive window glass 14 and the exterior flange of the side panel window opening of the automotive vehicle body 16 thereby creating a seal against outside weather elements and noise elements for the interior of said vehicle. Seal assembly 12 generally comprises an elongated support channel 18 and an elongated continuous tubular sealing member 20.

Figure 2:
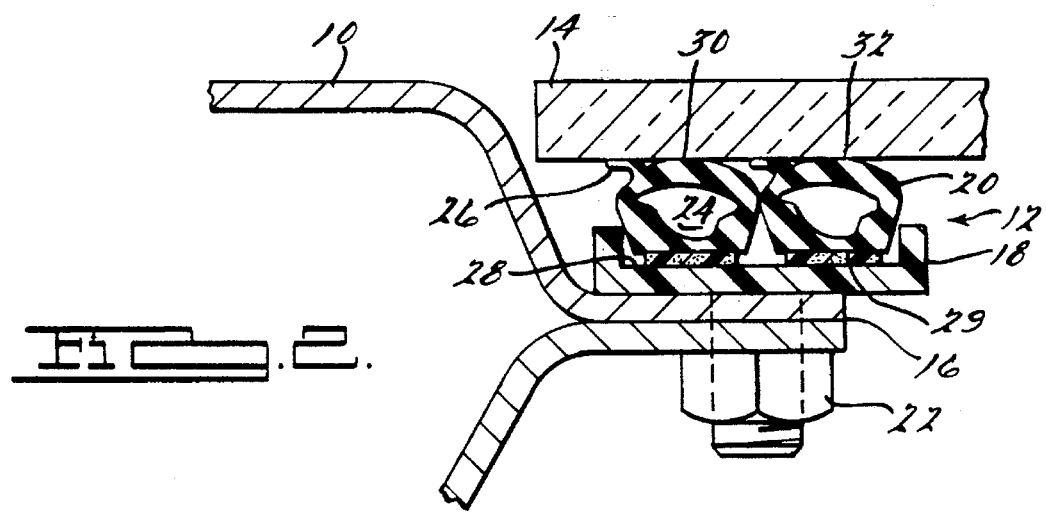
FIG. 2 is a sectional view of the seal assembly taken along lines 2—2 in FIG. 1.

As shown in greater detail by viewing FIG. 2, the elongated support channel 18 has a cross-sectional U-shaped configuration. The elongated support channel 18 is preferably made of polymeric or other non-corroding material such as polyvinyl chloride RIM or PET and extends around the window exterior flange 16. The elongated support channel 18 is preferably molded of one piece to fit continuously around the window exterior flange 16 and is secured by a fastening means 22. In the exemplary view, a bolt type fastener is used, however, adhesives or other rigid securing means may be employed.

Still referring to FIG. 2, the elongated continuous sealing member 20 is preferably a tubular, elastomeric strip with a hollow or foam-filled interior 24 and lip 26 and extends around the entire elongated support channel 18. The elongated continuous sealing member 20 is preferably secured by its own adhesive within the open channel 28 of the elongated support channel 18. For example, a dual sided adhesive tape 29 can be used to secure the sealing member 20 to the channel 28. The elongated continuous sealing member 20 is preferably made of EPDM or other synthetic elastomer.

Referring back to FIG. 1, the elongated continuous sealing member 20 is shown wound continuously around the elongated support channel 18 perimeter twice in an overlapping relation with itself to provide an inner seal 30 and an outer seal 32. Inner seal 30 extends around the window perimeter, then traverses diagonally at an angle Θ creating a transitional length 34. The elongated continuous sealing member 20 further extends around the inner seal 30 perimeter to form the outer seal 32 and ends abutting the transition portion 34.

The transition portion 34 is shown in greater detail in FIG. 3. In particular, the starting end 36 and finishing end 38 are shown cut at an angle Θ with respect to the longitudinal axis of the elongated continuous sealing member 20 to facilitate placing the end surfaces 36, 38 in abutting relationships with side surfaces of the transition portion 34.

Again referring back to FIG. 1, it will be appreciated that weather elements passing the edges of automotive window pane 14 are prevented from entering the interior of the automotive vehicle by first outer seal 32 and then the inner seal 30. It will also be appreciated that the seal assembly 12 of the present invention provides a seal which, in effect, has no through splice positioned along its perimeter in that any weather element passing finishing end 38 must proceed entirely around the exterior flange of the side panel window opening of the automotive vehicle body 16 before coming in contact with the starting end 36. Therefore, the construction of the present invention minimizes any potential leaking of seal assembly 12. Furthermore, it will be appreciated by those skilled in the art that use of relatively narrow elongated tubular elongated continuous sealing member 20 allows for ready curving around corners 40 having small radii. This features prevents twisting or bending and thereby provides seal effectiveness.

It will also be appreciated by those skilled in the art that the tubular elongated continuous sealing member 20 can be wound around the elongated support channel 18 two, three, four or even more times. Thus, multiple sealing contacts between the elongated continuous tubular sealing member 20, automotive window pane 14 and the exterior flange 16 can be obtained.

Now referring to FIG. 4, the process of manufacturing the elongated continuous tubular sealing member 20 is shown. Specifically, FIG. 4 diagrammatically illustrates raw EPDM or other elastomeric material 42 being fed into a hopper 44 and extruded by extruder 46. As shown, an elongated continuous sealing member strip 48 is extruded of desired thin cross-sectional shape and then cured by oven 50. The cured elongated continuous sealing member 52 then proceeds by means of a puller 54 to a taping station 56 where two-sided adhesive tape 58 is applied to one side of the cured elongated continuous sealing member 52. The elongated continuous sealing member 20 is thus, formed and then coiled onto reel 60 for storage and/or transport.

Now referring to FIG. 5, the taped elongated continuous sealing member 20 on reel 60 is then installed within support channel 18 on window module 62 by robot 64. It will be appreciated that window module 62 is intended to be subsequently installed on an automotive vehicle. It is contemplated that elongated continuous sealing member 20 will be cut to length by a cutting means 66 as illustrated in greater detail in FIG. 6. The elongated continuous sealing member 20 is transported by a pair of rollers 68 to the cutting area 76. Immediately downstream of rollers 68, release liner 70 of the two-sided adhesive tape 58 is removed and the elongated continuous sealing member 20 is cut to length by the cutting means 66 and then fed forward by a pair of feeder rollers 74 for application.

The elongated continuous sealing member 20 is cut diagonally at degree Θ as shown in greater detail by viewing FIG. 7. As best viewed by referring back to FIG. 3, the degree Θ is the angle of the bend that the elongated continuous sealing member 20 makes as it traverses from the inner seal 30 to the outer seal 32 of the seal assembly 12. The bend provides an abutting surface at an angle Θ for both ends 36, 38 of the elongated continuous sealing member 20 against opposing sides of the transition portion 34.

While a preferred embodiment of the present invention has been described herein, the invention is subject to modification and variation within the spirit of the invention. Therefore, it is to be understood that the scope of the present invention is to be limited not by the foregoing example of a preferred embodiment but by the following claims.

What is claimed is:

1. A seal assembly for installation between a flange on a vehicle and a window for sealing a perimeter of the window against the vehicle comprising:

an elongated support channel extending proximate with said window perimeter of the vehicle; and an elongated continuous tubular sealing member secured within said channel and extending around said channel at least twice in overlapping relation with itself to provide an inner seal and an outer seal with a transition portion therebetween, said elongated continuous tubular sealing member having a first and second end each positioned proximate to and abutting said transition portion.

2. The seal assembly of claim 1 wherein said elongated continuous tubular sealing member is extended around said channel in overlapping relation with itself to provide an inner seal, a middle seal and an outer seal.

3. The seal assembly of claim 1 wherein said elongated continuous tubular sealing member is cut at degree $\Theta$ which corresponds to an angle the elongated continuous tubular sealing member is bent to traverse from the inner seal to the outer seal creating the transition portion, said transition portion having abutting surfaces for each end of said elongated continuous tubular sealing member.

4. The seal assembly of claim 1 wherein said elongated continuous tubular sealing member is comprised of an elastomeric material.

5. The seal assembly of claim 1 wherein said support channel is comprised of a polymeric material.

6. The seal assembly of claim 1 wherein said elongated continuous tubular sealing member is adhesively mounted to said support channel by means of a dual sided adhesive tape.

* * * * *